United States Patent [19]

Groh et al.

[11] 4,452,754

[45] Jun. 5, 1984

[54] SHUTDOWN SYSTEM FOR A NUCLEAR REACTOR

[75] Inventors: Edward F. Groh, Naperville; Arne P. Olson, Western Springs; David C. Wade, Naperville; Bryan W. Robinson, Oak Lawn, all of Ill.

[73] Assignee: The United States of America as represented by the United States Department of Energy, Washington, D.C.

[21] Appl. No.: 340,905

[22] Filed: Jan. 20, 1982

[51] Int. Cl.³ .............................................. G21C 7/10
[52] U.S. Cl. .................................... 376/335; 376/227
[58] Field of Search ............... 376/335, 336, 219, 227

[56] References Cited

U.S. PATENT DOCUMENTS

| | | | |
|---|---|---|---|
| 3,232,842 | 2/1966 | Costes et al. | 376/335 |
| 3,945,886 | 3/1976 | Derevyankin et al. | 376/335 |
| 3,981,598 | 9/1976 | Taulier et al. | 376/336 |
| 4,001,078 | 1/1977 | Doll | 376/335 |
| 4,076,587 | 2/1978 | Taulier et al. | 376/335 |

FOREIGN PATENT DOCUMENTS

| | | | |
|---|---|---|---|
| 618121 | 4/1961 | Canada | 376/335 |
| 1330824 | 5/1963 | France | 376/335 |
| 989933 | 7/1965 | United Kingdom | 376/335 |

Primary Examiner—Sal Cangialosi
Attorney, Agent, or Firm—Bruce R. Mansfield; Paul A. Gottlieb; Michael F. Esposito

[57] ABSTRACT

An ultimate shutdown system is provided for termination of neutronic activity in a nuclear reactor. The shutdown system includes bead chains comprising spherical containers suspended on a flexible cable. The containers are comprised of mating hemispherical shells which provide a ruggedized enclosure for reactor poison material. The bead chains, normally suspended above the reactor core on storage spools, are released for downward travel upon command from an external reactor monitor. The chains are capable of horizontal movement, so as to flow around obstructions in the reactor during their downward motion.

1 Claim, 8 Drawing Figures

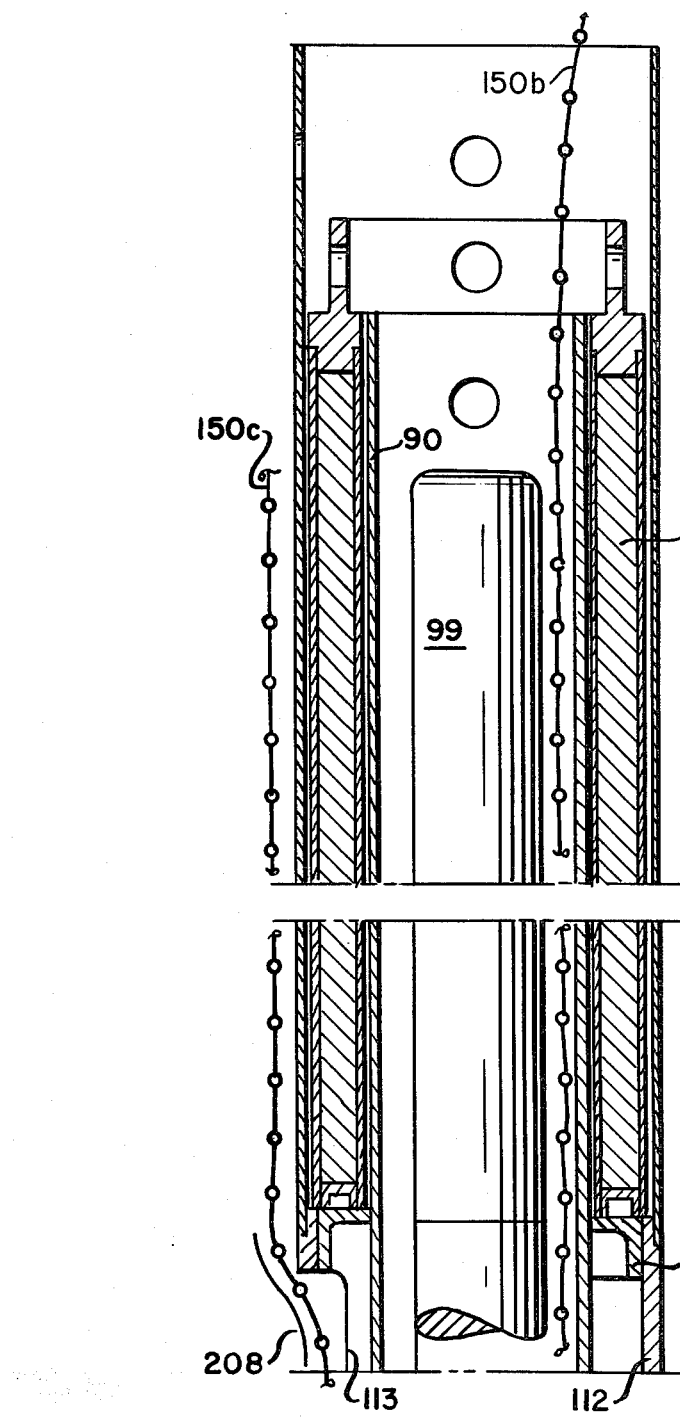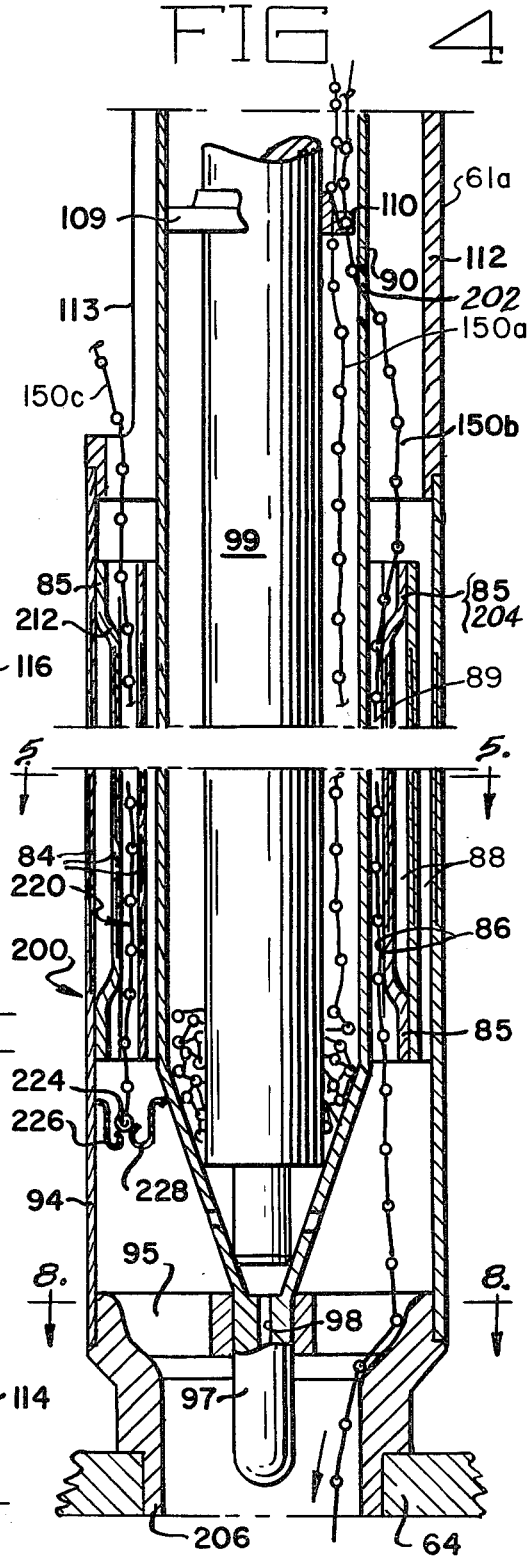

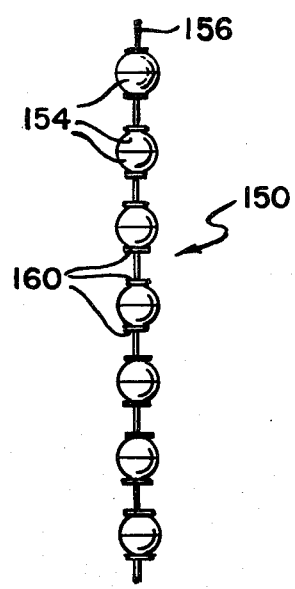
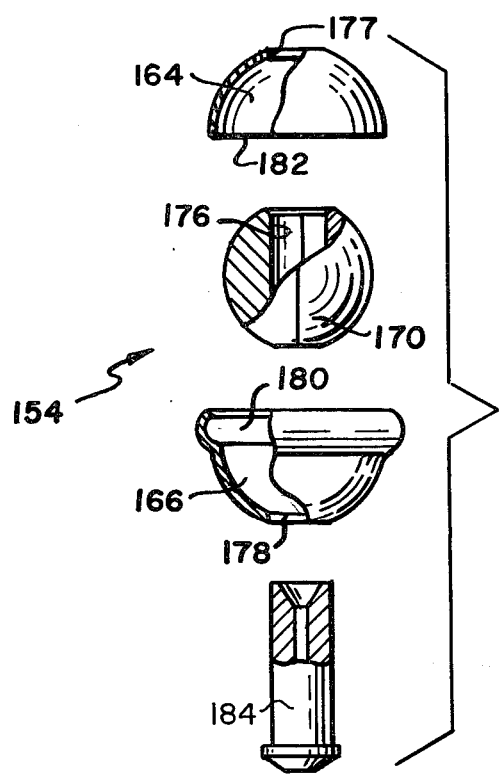
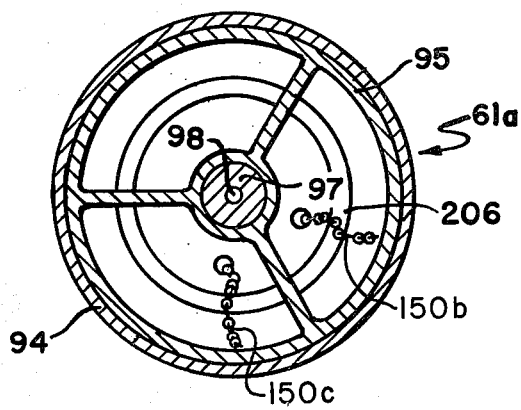

SHUTDOWN SYSTEM FOR A NUCLEAR REACTOR

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

One of the means by which operating control of the fissioning process in neutronic reactors is achieved, is through the limited absorption of neutrons released therein. The fissioning reaction within a nuclear core can be controlled by selective addition and removal of neutron absorbing material, typically in the form of absorber rods. Generally, a plurality of channels is provided in the core of a reactor, with the channels being adapted to receive rod-like control members having a combination of fuel element material and neutron-absorbing material. Such members are selectively moved to positions within the core of the reactor, so as to limit the neutron chain reaction therein such that a predetermined power level is maintained. The members containing neutron-absorbing material are generally actuated by electro-mechanical devices mounted on the reactor and operated remotely therefrom.

Neutronic reactors are also provided with shutdown means to suddenly terminate or quench the chain reaction taking place therein. Such means are provided for reasons of safety; that is, in the event that the ordinary control means fail, it is essential that the chain reaction be prevented from exceeding the physical limitations of the neutronic reactor. One means of terminating the chain reaction is to suddenly introduce safety members of neutron-absorbant material into the core of the neutronic reactor. The safety members are typically inserted into the core of a neutronic reactor by mechanisms similar to those utilized for the movement of control members. It is with such safety members and reactor shutdown assemblies that the present invention is concerned.

In a nuclear reactor, an inherent shutdown assembly typically includes a mass of nuclear absorbant material or poison positioned above the core region and sufficient to shutdown the entire system so as to quickly terminate any dangerous transients. When either the neutron flux or the core cooling temperature exceeds some critical value, a triggered latch is released to permit the poison mass to be inserted into the core. Shutdown assemblies therefore include means to sense either the temperature of the coolant or the activity of the neutron flux, means to hold the poison mass in a position above, and ready to be released into, the reactor core, and means for triggering the release of poison mass into the core when the sensing means indicates that a critical temperature has been reached or the neutron flux has reached a critical value. Present shutdown devices are generally designed for one-time use only. Such designs preclude in situ or ex-reactor testing of the shutdown arrangements. One example of a one-time device is a pelletized poison mass which is restrained by a membrane whose melting point is set at a critical temperature. When a critical temperature is reached the membrane melts, thus releasing the poison into the reactor core. Since it is a one-time-only device, the arrangement cannot be tested for paper operation prior to an actual reactor emergency. Also, present devices have separate sensing, triggering and release elements whose combination and interaction complicates reactor design and encumbers safe operation.

Particular difficulties are encountered in providing ultimate shutdown systems for vertical-type neutronic reactors, particularly existing reactors which are being upgraded or otherwise modified to improve their safety of operation. Vertical reactors have rigid vertical control and safety rods which must, under normal operation, be located outside the reactor core area, and upon demand must be inserted throughout approximately the entire vertical extent of the reactor core. When control rods, safety rods, or the like rigid vertically extending members are employed, the channels or tubes containing such members must extend above the reactor core area, occupying additional space above the reactor, approximately equal to the height of the reactor core. Difficulties are encountered in modifying vertical reactors wherein the control and safety members are positioned to enter a neutronic reactor from above so that in the event of a power failure, the control members will fall in a downward direction under the force of gravity to rest positions within the reactor core, thereby quenching the chain reaction. Such reactor arrangements must include continuous vertical channels or points of access into the reactor core from above. However, it is often difficult to locate such channels, especially in retrofitting a reactor, since some minor horizontal offsets are frequently required to circumvent existing equipment located in the path of the proposed channels. If the control and safety members cannot accommodate a horizontal offset, newly formed vertical access channels must be made to provide communication into the reactor core area. Even if space within and above the reactor is available, such arrangement is undesirable since degradation of containment structure results.

Further, some reactors, such as those used for testing reactor components or the like, have a rotating cover which provides access into the reactor interior. In this arrangement, vertical control rods and the like equipment members extending through the cover must be disconnected to allow rotation of the cap, so as to align passageways in the cap with passageways in the reactor interior. The required provision for disconnection means of shutdown members penetrating into the reactor vessel impairs the reliability of such emergency systems.

It is therefore an object of this invention to provide a compact inherent shutdown assembly for nuclear reactors, particularly vertical-type reactors.

Another object of this invention is to provide an inherent shutdown assembly which is resettable without requiring a dismantling of the reactor core.

Another object of this invention is to provide an inherent shutdown device which, upon demand, extends in a generally downward direction into the reactor core, but which is also capable of negotiating horizontal offsets in its generally vertical movement, to provide a continuous control element extending substantially the entire vertical extent of the reactor core.

Another object of this invention is to provide an inherent shutdown system which is compatable with a wide variety of types of control materials, which is fool-proof in operation, and which is inexpensive to fabricate.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

These and other objects of the present invention are provided by an ultimate shutdown system which includes an improved reactor safety member that is formed from a combination of spherical beads linked together to comprise a flexible chain. The individual beads of the chain are formed of two mating half-shell sections which contain a control material or poison. A hollow rivet extends through the diameter of the joined shell sections and a flexible cable is extended through the central hollow portion of the rivet. The beads are maintained in fixed position on the cable by means of spacer washers, which are crimped onto the cable. A continuous safety member is formed from a chain containing a plurality of such beads. The safety member is flexible and when dropped vertically, is capable of horizontal deflections, allowing the control rod to flow around corners or bends.

The bottom-most free end of the safety member is attached to a weight which is supported during normal reactor operation by spring-like release or trigger means. Upon receiving a signal demanding a reactor shutdown, the trigger operates to release the weight, allowing downward displacement of the flexible chain. The entire chain may be stored on a spool located either outside of or within the uppermost portions of a reactor vessel. Alternatively, portions of the chain may lie within the reactor vessel, even at positions within the reactor core. In this latter arrangement, the beads located along that portion of the flexible chain which lies within the reactor core during normal operation, will contain a neutronically inert material, one which does not absorb neutrons. In a given installation, the mass of neutron poison determines the number of safety members required for a given neutronic reactor. Each chain will generally contain beads of a given uniform size.

The safety member according to the invention may be easily retrieved by rewinding on a spool after a reactor shutdown without entering the reactor vessel.

DESCRIPTION OF THE DRAWINGS

FIGS. 3 and 4 are partial cross sectional views of a fuel assembly.

FIG. 6 shows a bead chain control rod according to the invention.

FIG. 7 is an exploded view of one of the beads of FIG. 6.

FIG. 8 is a cross-sectional view of the fuel assembly taken along the lines 8—8 of FIG. 4.

DETAILED DESCRIPTION OF THE INVENTION

Figure 1:
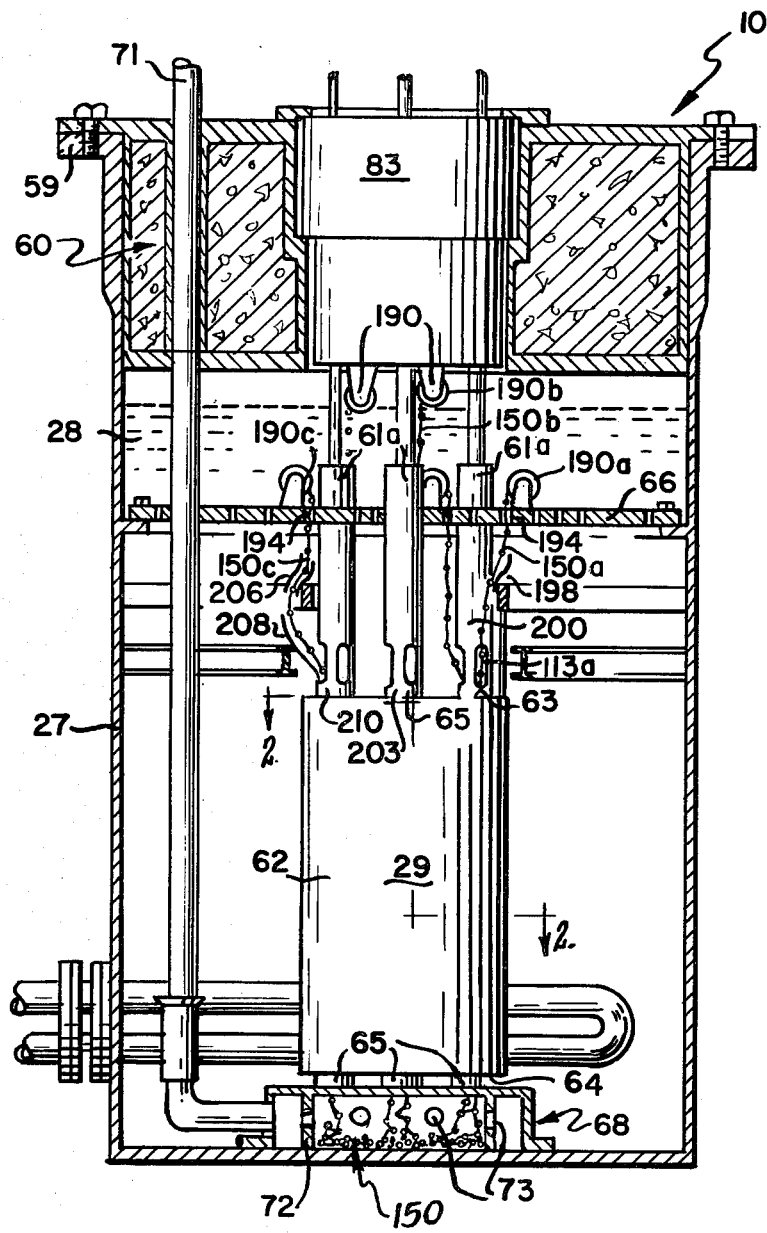
FIG. 1 is a cross-sectional view of a nuclear reactor including the ultimate shutdown system according to the invention.

Referring now to the drawings, and especially to FIG. 1, the numeral 10 is applied to a conventional research reactor which is designed so that experiments on biological specimens involving both high-level and low-level exposure to fission energy neutrons can be carried out simultaneously. An aluminum reactor vessel 27, filled with a light water 28, houses a nuclear core 29. A reinforced flange 59 located at the top of reactor vessel 27 supports a 48-inch diameter shielding cover 60 which is 21 inches in thickness and is made of stainless steel filled with a hydrogenous mixture containing boron and lead.

Figure 2:
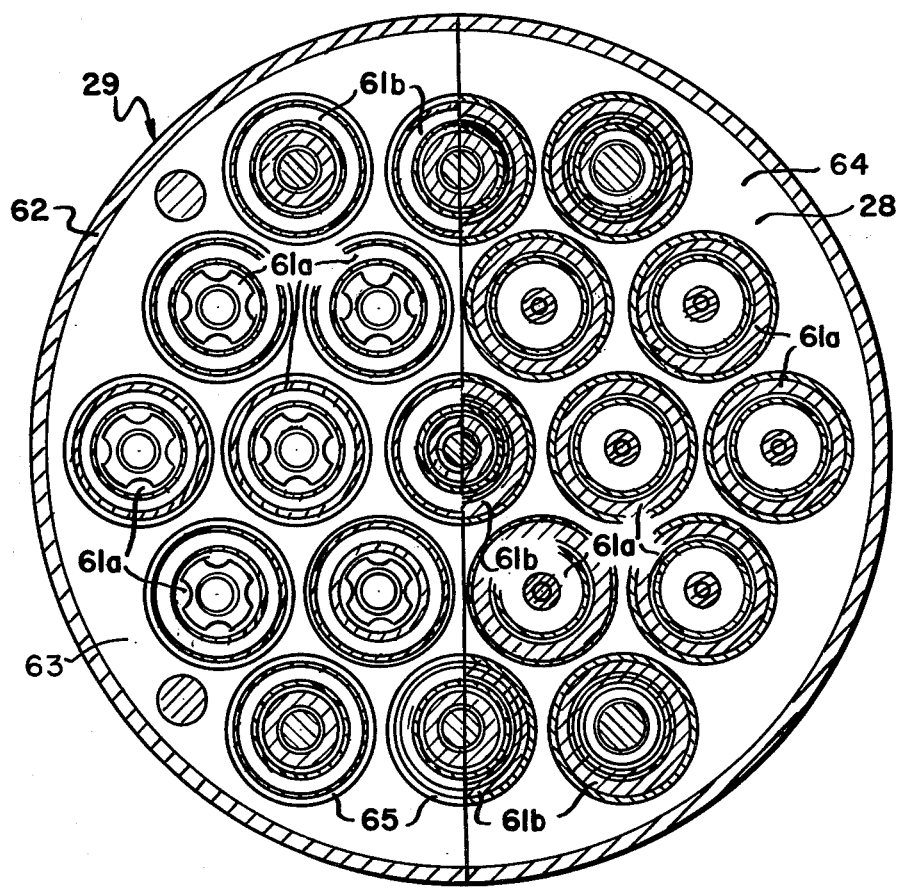
FIG. 2 is a cross-sectional view of the reactor core taken along the lines 2—2 of FIG. 1.

The reactor core 29 contains twelve fuel assemblies 61a and seven fuel-control assemblies 61b. As can be seen in FIG. 2, these assemblies are arranged in three concentric rings about a single fuel assembly 61b which is located along the axis of reactor core 29. Referring again to FIG. 1, a reactor drum 62 having an outside diameter of 17.5 inches encloses assemblies 61a, 61b. Drum 62 is provided with top and bottom plates 63 and 64, respectively, which are formed of ¾" thick stainless steel. The total length of the drum is 31.5 inches. Nineteen aluminum tubes 65 for containing assemblies 61a and 61b are welded to support plate 66 which provides alignment for the upper portions of those assemblies. A plenum chamber 68 attached to the bottom of reactor vessel 27 is provided with openings for receiving tubes 65. The vacant space in drum 62 between assemblies 61a, 61b, is completely filled with 1/16" diameter graphite spheres or moderator material not shown in the drawings. A water inlet pipe 71 extends through shielding cover 60, and terminates in plenum chamber 68. Plenum chamber 68 includes an annular baffle 72 having openings 73 which provide uniform flow through the fuel assemblies. A large rotatable cap or plug 83 is mounted in shielding cover 60 over core 29. Single access openings are provided in this rotatable plug such that each assembly 61a, 61b can communicate with the interior of the reactor core 29.

Figure 5:
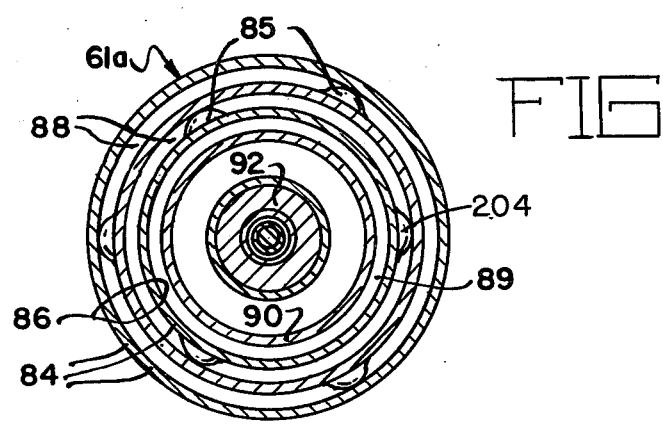
FIG. 5 is a cross sectional view of the portion of the fuel assembly taken along the lines 5—5 of FIG. 4.

As shown in FIGS. 3, 4 and 5, fuel assemblies 61a comprise three coaxial tubes 84 which are joined at lobes 85 to form a unitary fuel tube bundle 86. Annular channels 88 between the fuel tubes 84 provides space for circulation of water between the fuel tubes. Another annular channel 89 separates inner-fuel tube 84 from aluminum thimble 90. Reactor water is also circulated through channel 89. A lower extension member 94, shown in FIG. 4, connects fuel tubes 84 to a spider 95 which is affixed to the plenum chamber 68 of FIG. 1. Thimble 90 is provided with an elongated cylindrical tip 97 which seats in spider 95. Aperture 98 in tip 97 permits the circulation of water through thimble 90, as well as the poison rod and associated equipment contained therein. The numeral 99 is applied to the assembly contained within thimble 90. Within assembly 99 is an aluminum jacket which encloses a burnable poison rod not shown in the drawings. Burnup of the poison rod will tend to compensate for the decrease of reactivity occasioned by fuel burnup and fission product poisoning. Assembly 99 is maintained in spaced relationship to thimble 90 by a spacer member 109 having openings 110 therein. Fuel tube extension 112, secured to the upper portions of fuel tube bundle 86, has coolant outlet openings 113. Lead weights 116 are supported by platform 114, and serve to hold down the fuel assembly in reactor core 29.

Seven fuel and control assemblies 61b are also employed in the reactor core. Assemblies are substantially similar to fuel rods 61a, but for the addition of a cadmium rod jacketed in corrosion-resistant metal, which addition serves as a control rod. The control rod of each assembly 61b is located within thimble 90 and essentially replaces the assembly 99 of fuel rods 61a. Six of the seven fuel and control assemblies 61b are located around the three concentric circles of reactor core 29 and serve as safety rods. These safety rods are suspended in reactor core 29 by electromagnetic clutches not shown in the drawings, so that they may be quickly dropped in response to an emergency operation command. The seventh fuel and control rod 61b is located along the axis of reactor core 29, and serves as a regulating rod which can be accurately positioned anywhere between its extreme vertical positions as required during operation of the reactor.

The ultimate shutdown system according to the invention will now be described with reference to the reactor 10 described above. As the reactor is operated, a fine control of the reaction is provided by movement of the regulating rod i.e. the central fuel and control rod 61b. If greater control of the reactor is required, one or more of the six remaining fuel and control rods 61b are lowered into position in reactor core 29. If for some reason still greater control is required, or if the movement of rods 61b is delayed or otherwise impaired, the ultimate shutdown system of the invention will be employed to quickly and effectively stop the nuclear reaction in reactor 29. In general, shutdown is achieved by introducing a sufficient quantity of poison or neutron absorbing material into reactor core 29. This material must not be present in the core during normal reactor operation, but must on command from an operator or alarm sensor system, be inserted adjacent to fuel elements contained in fuel assemblies 61a, 61b.

As shown in FIG. 6, a safety control rod or bead chain 150 comprises a series of spaced-apart beads 154 strung unto flexible cable 156. Beads 154 are held in precise spaced-apart configuration by lockwashers 160, which are crimped onto cable 156. Referring now to FIG. 7, a single bead 154 is shown in an exploded view. Mating container members or hemispherical shells 164, 166 form a rugged spherical container for poison material 170, such as an alloy of boron or a cadmium, both typically friable materials having a high neutron absorption rate. Poison material 170 is comprised of two hemispherical portions, each having grooves on their adjoining faces which form a channel 176 when the two portions are drawn together. Container members 164, 166 are formed of stainless steel and have apertures 177, 178 respectively, which communicate with channel 176 when the container is assembled about poison material 170. Container member 166 has an enlarged opening 180 which receives an overlies the open end 182 of container member 164. After the assembly of poison material 170 and container members 164, 166 a hollow fastener or rivet member 184 is inserted through apertures 177, 178 and channel 176 of poison material 170. Rivet 184 is then heeled over at each end to secure poison material 170 within a rugged stainless steel container. Rivet 184 has a hollow core or channel extending throughout its entire length for reception of flexible cable 156. After an individual bead 154 is located on the flexible cable 156 lockwashers 160 are attached to cable 156 on either side of bead 154, by crimping or the like fastening arrangement.

Referring again to FIG. 1, several bead chains 150 according to the invention are shown installed in reactor 10. The operation of three bead chains 150, designated 150a, 150b and 150c will be described. The bead chains are stored during normal operation of the reactor on spools 190. A short length of bead chain is normally paid out of each spool, so as to unbalance and thereby bias the spool for rotation in a direction which will release the remainder of the stored bead chain. Each spool 190 includes locking devices, not shown in the drawings, for releasing the spools for rotation upon command from an operator or an alarm system. Once the spools are released, the bead chain unrolls from the spool, increasing the bias force on the spool which further aids unrolling of the bead chain.

Advantages of the bead chain construction can now be seen with reference to FIGS. 1, 3, 4, and 8. Bead chain 150a, mounted on the particular spool 190 identified by the numeral 190a, is fed through an opening 194 in wall 66 and is maintained in that position during the normal operation of reactor 10. When control is required spool 190a is released, allowing the lower free end of chain 150a to drop and thereby contact guide shoe 198 located adjacent opening 113 of a particular fuel assembly 61a identified by the numeral 200. With reference to FIG. 4, chain 150a travels through opening 110 in spacer 109 and the passageway formed between thimble 90 and assembly 99. Thus, the poison material 170 of several beads 154 is disposed adjacent the fuel assembly 99.

Similarly, bead chain 150b of FIG. 1 is stored on spool 190b, and enters the open top of a particular fuel assembly 61a designated by the numeral 203. With reference to FIG. 4 bead chain 150b enters the passageway between cylinders 90, 112. To aid in the description of the invention, the fuel assembly 61a of FIG. 4 will be used to illustrate a composite description of the fuel assemblies 200, 203 and 210 of FIG. 1. Chain 150b is deflected by spacer 109 through aperture 202 formed in thimble 90. Chain 150b continues to move downwardly between thimble 90 and extension 112 until it contacts lobe 204, one of the lobes 85 described above. Lobe 204 is not radially continuous as can be seen with reference to FIG. 5. The construction of the bead chain allows it to be deflected by lobe 204, so as to continue its downward motion where it is again deflected by collar 206 located adjacent tip 97 and spider 95.

Several advantages of the shutdown system according to the invention will now become apparent to those retrofitting or otherwise modifying existing nuclear reactors. By utilizing the shutdown system of the present invention, poison material can be stored in a very small space during normal operation of the reactor. In one application, the stored spool and associated mounting and release equipment required only a twelve inch vertical clearance space. Also, since the bead chains are capable of horizontal deflection, they need not be stored directly over an access opening as was previously required with rod-like or curtain-like structures. Similarly, the bead chains do not require an unobstructed, straight-line path as previous systems did. As demonstrated above, bead chains 150a and 150b, because of their horizontal deflection capabilities, could follow somewhat tortuous paths through the reactor structure and fuel tube bundles. These features are especially advantageous when applied to existing reactor constructions, which are modified so as to require greater ultimate shutdown protection. With the bead chain of the present invention, existing test ports, unused equipment mounting sites, and fuel tube constructions can be used to accommodate the shutdown system according to the invention.

The foregoing shutdown arrrangements each incorporated a bead chain having a lower free end which penetrated spaces and passageways in the reactor to assume a position adjacent the fuel elements. Referring now to FIGS. 1 and 3, a variation of this arrangement will be set forth. Chain 150c, mounted on spool 190c, is deflected by guide shoes 206, 208, into an opening 113 of fuel tube 210. With reference to FIGS. 4 and 8, chain 150c continues to travel between adjacent tubes 84, being deflected by lobe 212, one of the lobes 85 described above. The lower portion of chain 150c, extending below lobe 212 and terminating with a weight 224, is designated by numeral 220. In this embodiment, the beads of the lower portion 220 of chain 150c, adjacent the fuel elements during normal reactor operation, each contain a non-poison or neutronically inert material of roughly the same weight as the poison material described above. Weight 224 is held in position during normal reactor operation by springs 226, 228, which anneal at a predetermined critical reactor temperature. When heated to the critical temperature, springs 226, 228 lose their spring force, releasing weight 224 so it can drop to the floor of reactor 10. All portions of chain 150c located above springs 226, 228 are contained in a pathway that does not allow the bead chain to "double-up" or overlap itself. However, that portion of bead chain 150c which drops below springs 226, 228, during operation of the shutdown system, is free to overlap itself or otherwise coil up on the reactor floor, thereby allowing additional bead chain to be paid out of its stored spool. This in turn will allow beads containing poison material to drop into position adjacent the fuel elements of the reactor core. Springs 226, 228 are made of phosphor bronze or beryllium bronze material. Upon cooling after the springs are annealed, the original spring force and configuration of the springs is restored. Thus, upon retreival of the bead chain, the weight can be pulled above springs 226, 228, allowing the bead chain to be reset for another shutdown operation.

It can be seen that the bead chain arrangements described above can easily be retrieved after a reactor shutdown operation is completed and a normal operating condition restored. Because of the flexible features of the bead chain as described above, the bead chain is not likely to become snagged or otherwise impeded during retrieval.

The embodiments of the invention in which an exclusive property or privilege is claimed are defined as follows:

1. An ultimate shut down system for a nuclear reactor having fuel elements, comprising:

a plurality of hollow substantially spherical beads having a passageway extending therethrough, said beads comprised of first and second hemispherical mating shells of neutronically inert alloy, each shell having an aperture which defines a portion of said passageway;

substantially spherical reactor poison material contained in at least a few of said beads, said poison material having a channel extending entirely therethrough;

said first and said second hemispherical shells enclosing said reactor poison material such that said apertures of said first and said second hemispherical shells communicate with said channel of said reactor poison material to form said passageway;

a hollow core rivet having a hollow shaft extending therethrough, said rivet extending through said passageway of said bead and securing said hemispherical shells in mating engagement;

a flexible tether passing through said passageways of said plurality of beads so as fo form a bead chain therewith; and washer-like means for securing said beads at spaced-apart points along said tether such that said beads are allowed to rotate about said tether while being captivated to prevent translation along said tether, successive ones of said beads contacting each other when said tether is flexed, so as to limit the bending radius of said bead-chain to a predetermined minimum.

* * * * *